(12) United States Patent
Saito et al.

(10) Patent No.: US 7,595,946 B2
(45) Date of Patent: Sep. 29, 2009

(54) IMAGING APPARATUS AND PORTABLE APPARATUS

(75) Inventors: Sekio Saito, Saitama (JP); Hidenori Takahashi, Saitama (JP); Yoshiyuki Takase, Saitama (JP)

(73) Assignee: Fujinon Corporation, Saitama-Shi (JP)

(*) Notice: Subject to any disclaimer, the term of this patent is extended or adjusted under 35 U.S.C. 154(b) by 25 days.

(21) Appl. No.: 11/905,122

(22) Filed: Sep. 27, 2007

(65) Prior Publication Data
US 2008/0080073 A1 Apr. 3, 2008

(30) Foreign Application Priority Data
Sep. 29, 2006 (JP) ............................ P2006-269711

(51) Int. Cl.
*G02B 7/02* (2006.01)
(52) U.S. Cl. ............................... 359/824; 359/822
(58) Field of Classification Search ......... 359/819–824, 359/694–700; 396/72, 73, 75
See application file for complete search history.

(56) References Cited

U.S. PATENT DOCUMENTS

| | | | |
|---|---|---|---|
| 5,384,524 A | 1/1995 | Romano | 318/569 |
| 7,025,273 B2* | 4/2006 | Breytman et al. | 235/462.37 |
| 2007/0133092 A1* | 6/2007 | Maeda et al. | 359/557 |
| 2007/0133110 A1 | 6/2007 | Huang | 359/824 |
| 2009/0002503 A1* | 1/2009 | Sekino et al. | 348/208.99 |

FOREIGN PATENT DOCUMENTS

| | | |
|---|---|---|
| CN | 1368658 A | 9/2002 |
| JP | 2005-50519 A | 2/2005 |
| JP | 3120599 U | 3/2006 |

\* cited by examiner

*Primary Examiner*—Mohammed Hasan
(74) *Attorney, Agent, or Firm*—Birch, Stewart, Kolasch & Birch, LLP.

(57) ABSTRACT

An imaging apparatus including a lens drive portion and an imaging lens. The lens drive portion, in response to a current signal moves the imaging lens to a position corresponding to the current signal in the optical axis direction. The imaging apparatus also includes a movement control portion that provides a current signal to the lens driving portion. The current signal is gradually changed from a first current signal corresponding to a first position before movement of the imaging lens, to a second current signal corresponding to a second position after movement.

6 Claims, 10 Drawing Sheets

IMAGING APPARATUS AND PORTABLE APPARATUS

BACKGROUND OF THE INVENTION

1. Field of the Invention

The present invention relates to an imaging apparatus comprising an imaging lens, and an image pickup device which is placed behind the imaging lens, and also to a portable apparatus comprising the imaging apparatus.

2. Description of the Related Art

In many recent portable telephones, an imaging apparatus is mounted. A portable telephone itself has a small and thin structure. In the case where an imaging apparatus is mounted in a portable telephone, therefore, the imaging apparatus to be mounted in the portable telephone is requested to have a structure which is smaller and thinner than the small and thin structure of the portable telephone.

In some of such imaging apparatuses which are requested to have a small and thin structure, a voice coil motor is used in order to simplify the structure of a portion for holding an imaging lens, and that of a lens drive portion which moves the imaging lens in the optical axis direction (for example, see Japanese Utility Model Registration No. 3,120,599 and JP-A-2005-50519).

FIG. 1 is a view showing an example of the configuration of an imaging apparatus comprising a voice coil motor.

The imaging apparatus shown in FIG. 1 comprises: a lens module 100 having an imaging lens 10, and a voice coil motor (hereinafter, referred to as VCM) for driving the imaging lens 10; an image pickup device 103 which is placed behind the imaging lens provided in the lens module 100; an imaging circuit 12 which produces a signal indicative of the driving direction and position of the imaging lens based on an image signal produced by the image pickup device 103; and a VCM driving circuit 13 which drives the VCM provided in the lens module 100 in accordance with the signal from the imaging circuit 12 indicating the driving direction and the driving position. Actually, the lens module 100 and image pickup device 103 which are shown in FIG. 1 are integrally configured. In the following description, therefore, they are generically referred to the imaging unit 10.

FIG. 2 is a view illustrating the internal configuration of the imaging unit 10.

FIG. 2A shows the internal configuration of the imaging unit 10, and FIG. 2B shows the state where coils 102a, 102b provided respectively in VCMs in the imaging unit 10 are energized by the VCM driving circuit 13 shown in FIG. 1, and an imaging lens 1000 is moved together with the coils 102a, 102b, by broken lines.

FIGS. 2A and 2B show the configuration where two magnets 101a, 101b provided in the imaging unit 10 shown in FIG. 1, and the two coils 102a, 102b which are placed in magnetic fields formed by the magnets 101a, 101b, and which, upon an input of a current, receives a force in the optical axis direction to move the imaging lens 1000 to a position corresponding to the current signal are disposed on the both sides of the imaging lens 1000. Actually, boards are fixed to a holding portion which holds the lens, and windings serving as the coils are formed on the boards, respectively.

The configuration will be described with reference to FIGS. 2A and 2B.

As shown in FIGS. 2A and 2B, the image pickup device 103 is fixed to the middle of a board 110 which is larger than the external shape of the image pickup device 103, and springs SP1, SP2 are disposed on the board 110 on the both sides across the image pickup device 103, respectively. The two coils 102a, 102b are extensibly supported by the springs SP1, SP2, respectively, and the imaging lens 1000 is held from the both sides by the coils 102a, 102b. The magnets 101a, 101b are disposed outside the coils 102a, 102b. The N- and S-poles of the magnets 101a, 101b are juxtaposed. The coils 102a, 102b which are placed in the magnetic fields formed by the magnets 101a, 101b are vertically disposed across the imaging lens 1000 of FIG. 2. The two coils 102a, 102b and the two magnets 101a, 101b cooperate to move the imaging lens 1000 against the spring urging or in the direction of the spring urging.

Namely, when a current is supplied from the external VCM driving circuit 13 to both the one coil 102a and other coil 102b which are provided in the two VCMs, a magnetic fields is generated in each of the coils 102a, 102b existing in the magnetic fields formed by the both magnets 101a, 101b, an interaction between the magnet 101a and the coil 102a causes the imaging lens 1000 to be moved together with the coil 102a, and that between the magnet 101b and the coil 102b causes the imaging lens 1000 to be moved in the optical axis direction together with the coil 102b.

FIG. 3 is a view showing a current supplied to the coil 102, and a displacement of the imaging unit 10 incorporating the imaging lens.

FIG. 3A shows an input waveform of the current supplied to the coils 102a, 102b when the imaging unit 10 is to be moved from a position before movement to that after movement. FIG. 3B shows a displacement of the imaging lens 1000 which, when a current is caused to flow through the coils 102a, 102b by the input waveform, receives a force due to interactions between the currents flowing through the coils 102a, 102b and the magnets 101a, 101b, to be moved in the optical axis direction. The ordinate in FIG. 3A indicates a driving current, and the abscissa indicates the time (second). The ordinate in FIG. 3B indicates the displacement of the imaging lens, and the abscissa indicates the time (second).

When a current of 80 mA is supplied to each of the coils 102a, 102b in a step-like manner as shown FIG. 3A, for example, the imaging lens 1000 is moved to a position in the vicinity of 0.45 mm from the position before movement, and is stopped there.

In the structure shown in FIG. 2, however, the coils 102a, 102b are supported by the springs SP1, SP2 so as to be extensible in the optical axis direction, and therefore, when a step-like signal is supplied to the coils 102a, 102b and the coils 102a, 102b are vigorously moved together with the imaging lens 1000, a large external force is suddenly applied to the springs SP1, SP2 supporting the coils 102a, 102b. As a result, the springs SP1, SP2 vibrate, and, in the case of the example shown in FIG. 3B, the imaging unit is slowly stopped after an elapse of 0.2 seconds.

In the case where a mobile unit such as an imaging lens is disposed in a small and thin structure of a portable telephone or the like, it is often that, in order to movably hold an imaging lens as shown in FIG. 2, the imaging lens or the like is held by using an elastic spring or the like.

SUMMARY OF THE INVENTION

In view of the above-discussed circumstances, it is an object of the invention to provide an imaging apparatus in which, when an imaging unit is moved in the optical axis direction by a VCM, the imaging unit can be stopped within a time period that is shorter than the prior art, and a portable apparatus comprising the imaging apparatus.

In order to attain the object, the imaging apparatus of the invention comprises: an imaging lens; an image pickup device that is placed behind the imaging lens; a lens drive portion that includes a magnet that forms a magnetic field and a coil, placed in the magnetic field, that, upon an input of a current signal, receives a force in an optical axis direction to move the imaging lens to a position corresponding to the current signal, the lens drive portion holding the imaging lens, and moving the imaging lens to the position corresponding to the current signal in the optical axis direction; and a movement control portion that, when the imaging lens is to be moved, gives to the lens drive portion, a current signal that is gradually changed from a first current signal corresponding to a first position before movement of the imaging lens, to a second current signal corresponding to a second position after movement.

According the imaging apparatus of the invention, when, under the control of the movement control portion, the imaging lens is held by the lens drive portion to the position before movement, the current signal that is gradually changed from a current signal corresponding to the position before movement of the imaging lens, to a current signal corresponding to the position after movement is supplied to a coil of a VCM constituting the lens drive portion, and the imaging lens is moved to the position after movement.

Namely, when, under the control of the movement control portion, the imaging lens is to be moved to the position corresponding to the current signal by the VCM which is the lens drive portion, the imaging lens is slowly started to be moved, and thereafter moved to a desired position while gradually increasing the speed, and stopped there.

According to the configuration, even when the imaging lens is supported by an elastic spring or the like, the imaging lens can be driven while an external force is gradually applied to the spring and the vibration is suppressed. Therefore, the imaging lens can be stopped at a predetermined position within a short time period.

The movement control portion may comprise: a current signal producing circuit that produces a current signal that is changed in a step-like manner from the first current signal corresponding to the first position before movement of the imaging lens, to the second current signal corresponding to the second position after movement; and a current waveform converting circuit that receives the current signal that is produced by the current signal producing circuit and is changed in a step-like manner, produces the current signal that is gradually changed from the first current signal corresponding to the first position before movement of the imaging lens, to the second current signal corresponding to the second position after movement, and supplies the produced current signal to the lens drive portion.

Alternatively, the movement control portion may comprise: a voltage signal producing circuit that produces a voltage signal that is gradually changed from a first voltage signal corresponding to the first position before movement of the imaging lens, to a second voltage signal corresponding to the second position after movement; and a voltage-current converting circuit that converts the voltage signal produced by the voltage signal producing circuit to a current signal, and supplies the current signal to the lens drive portion.

In the case where the movement control portion is configured by the voltage signal producing circuit and the voltage-current converting circuit, preferably, the voltage signal producing circuit is a D-A converter that receives digital data that are gradually changed from digital data corresponding to the first position before movement of the imaging lens, to digital data corresponding to the second position after movement, and converts the input digital data to an analog voltage signal.

According to the configuration, the D-A converter can be controlled by a processor such as a CPU, and hence the configuration of the periphery of the voltage signal producing circuit is simplified. When a D-A converter is used, the D-A converter and the voltage-current converting circuit in the subsequent stage can be integrated into one chip as periphery devices of the CPU.

In order to attain the object, the portable apparatus of the invention is a portable apparatus comprising an imaging apparatus, the imaging apparatus comprising: an imaging lens; an image pickup device that is placed behind the imaging lens; a lens drive portion that holds the imaging lens and moves the imaging lens to a position corresponding to a current signal in an optical axis direction; and a movement control portion that, when the imaging lens is to be moved, gives to the lens drive portion, a current signal that is gradually changed from a first current signal corresponding to a first position before movement of the imaging lens, to a second current signal corresponding to a second position after movement.

DETAILED DESCRIPTION OF THE INVENTION

Hereinafter, embodiments of the invention will be described with reference to the accompanying drawings.

Figure 4:
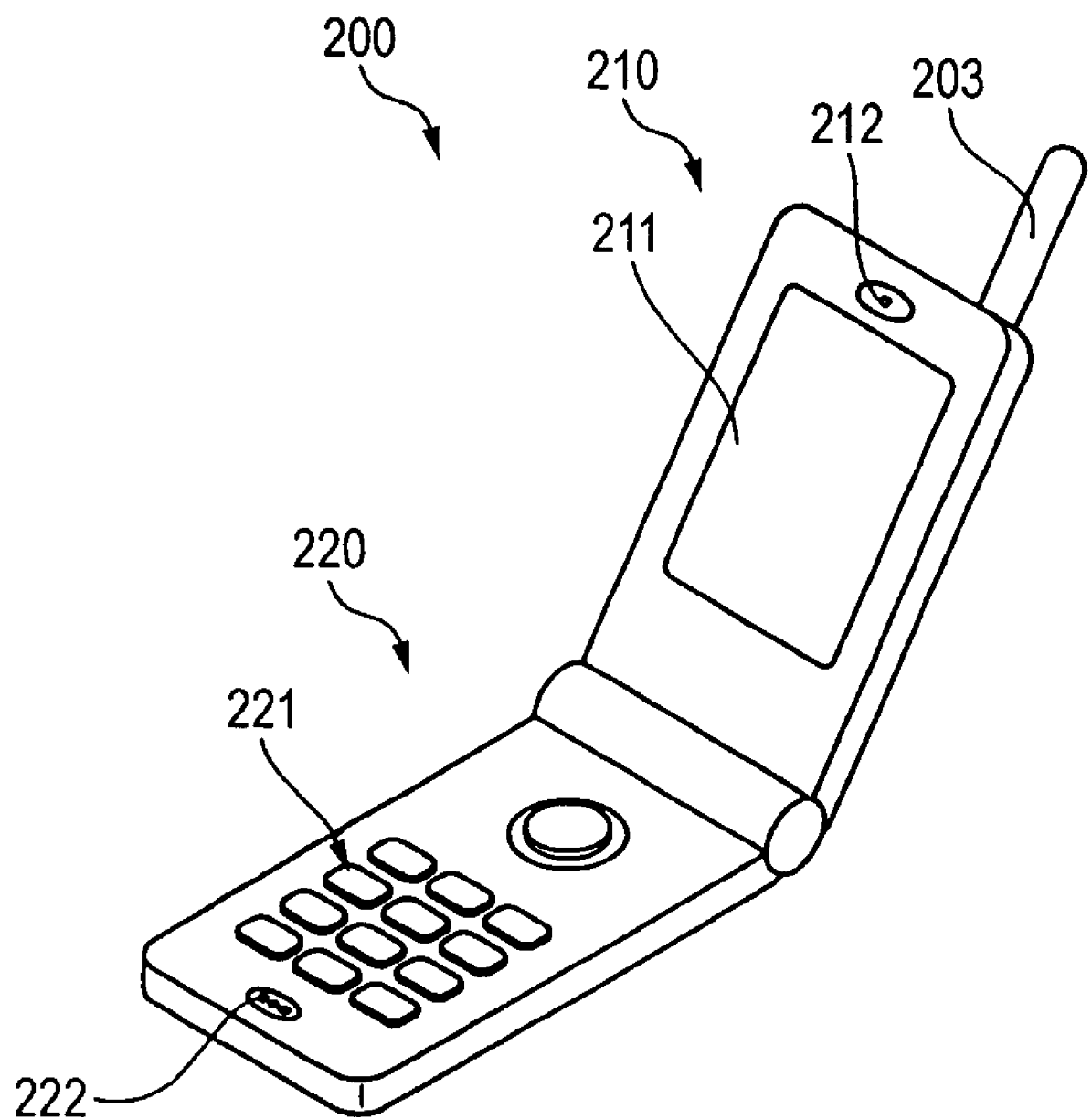
FIG. 4 is a perspective view showing the configuration of the front side of a portable telephone 200 comprising the imaging apparatus of the invention.
Figure 5:
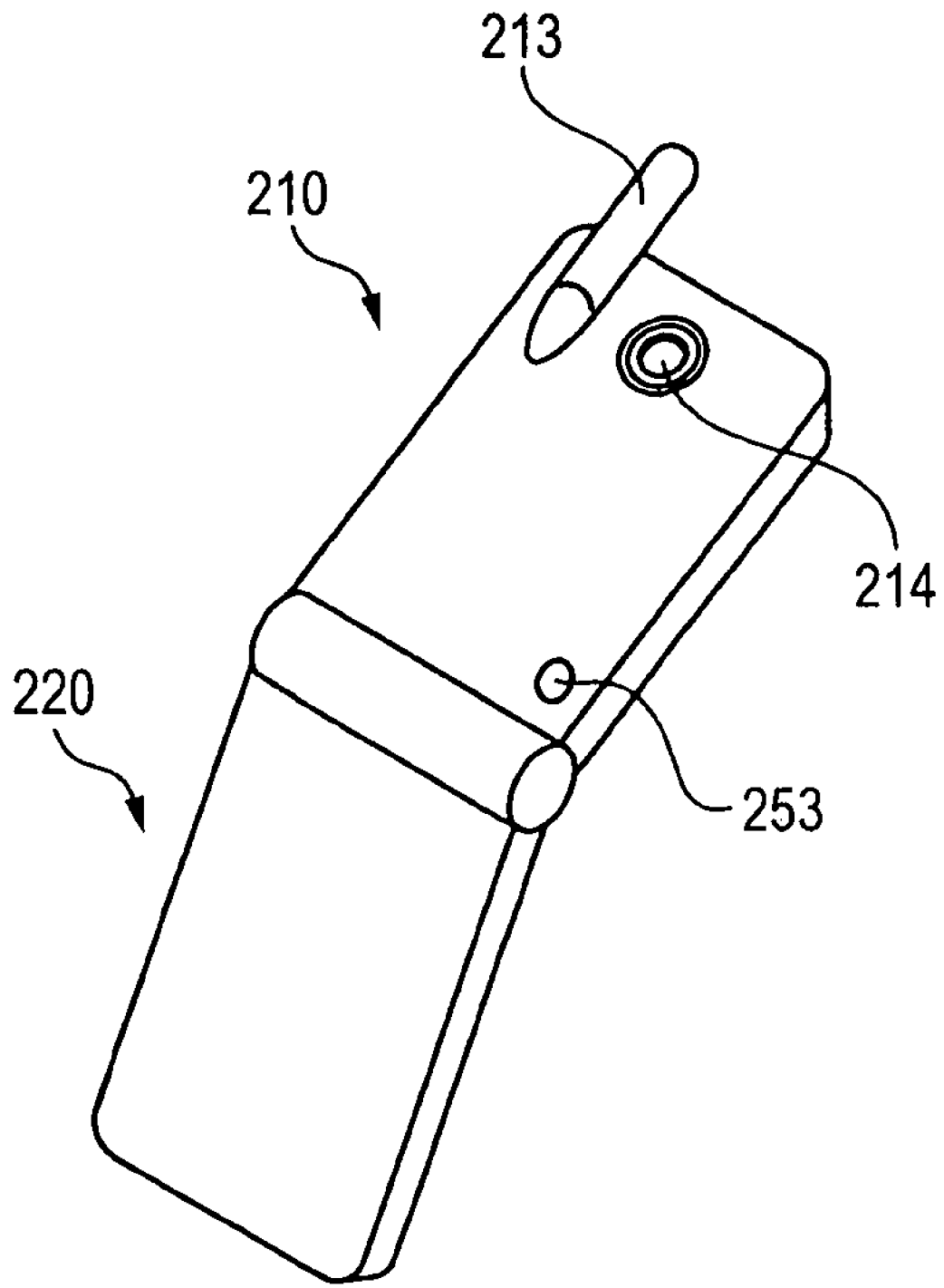
FIG. 5 is a perspective view showing the configuration of the rear side of the portable telephone 200 comprising the imaging apparatus of the invention.
Figure 6:
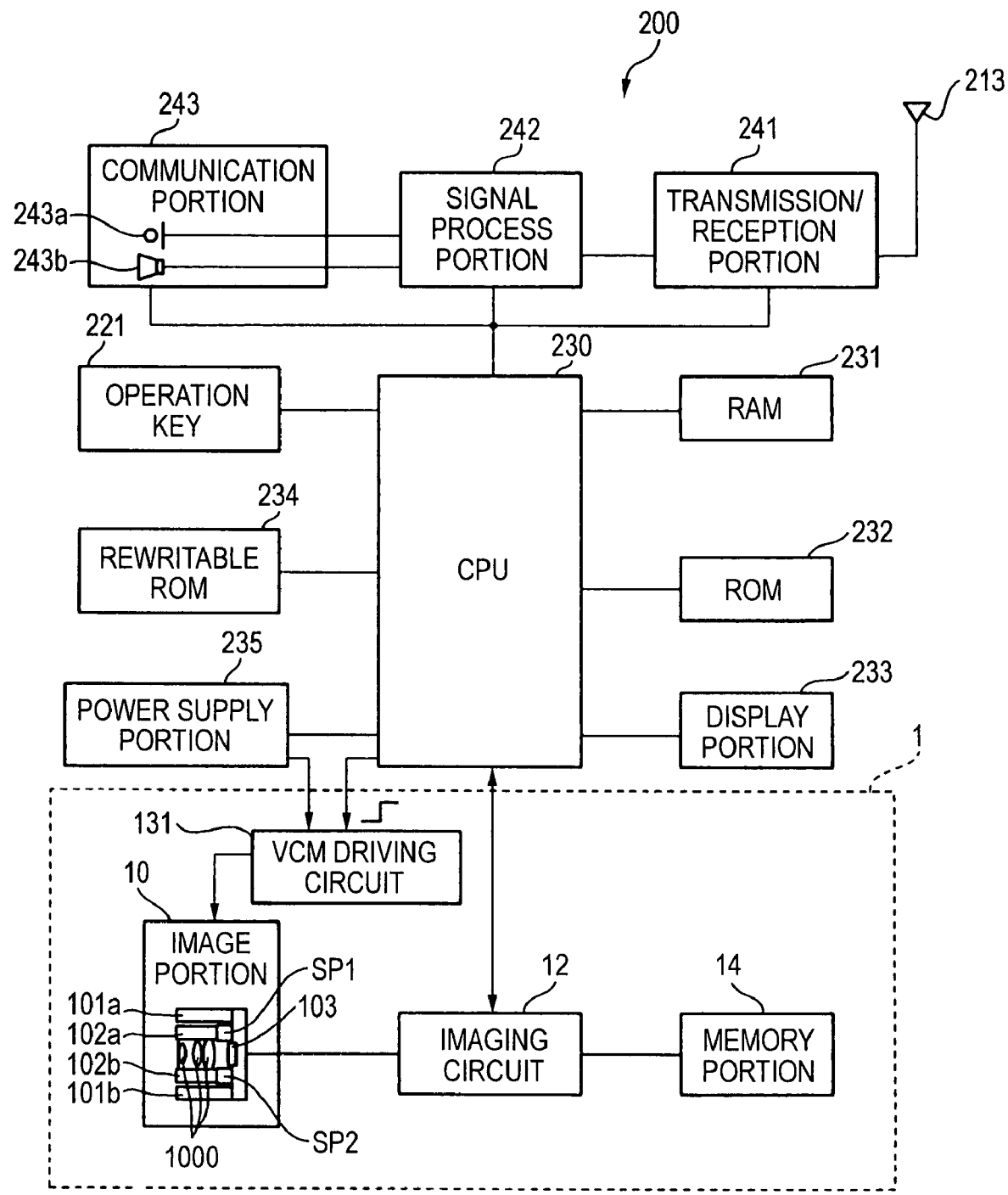
FIG. 6 is a view showing the configuration of the interior of the portable telephone 200 comprising the imaging apparatus of the invention.

FIGS. 4 to 6 are views showing an example of the configuration of a portable telephone 200 comprising the imaging apparatus of the invention.

FIGS. 4 and 5 are perspective views respectively showing the surface and rear face of the portable telephone 200.

The portable telephone 200 is configured by an upper portion 210 and a lower portion 220, and foldable.

The upper portion 210 of the portable telephone 200 comprises a display screen 211, an earpiece 212, an antenna 213, and a camera imaging lens 214 placed on the rear face. The lower portion 220 comprises operation keys 221 and a mouthpiece 222.

FIG. 6 is a block diagram showing the internal configuration of the portable telephone the appearance of which is shown in FIGS. 4 and 5.

The portable telephone 200 is configured so that the whole is controlled by a CPU 230. To the CPU 230, connected are: a RAM 231 which is a volatile memory; a ROM 232 which is a nonvolatile memory; a display portion 233 comprising the display screen 211 shown in FIG. 4; the operation keys 221 shown also in FIG. 4; a rewritable ROM 234 which is a rewritable nonvolatile memory; and a power supply portion 235.

The ROM 232 stores programs which are to be executed by the CPU 230, etc. The rewritable ROM 234 stores programs which are downloaded by packet communication. The programs stored in the ROM 232 and the rewritable ROM 234 are executed by the CPU 230, whereby operations of various portions of the portable telephone 200 are controlled. The RAM 231 is used as a work space for transmission of data to the external, etc.

The display portion 233 comprises the display screen 211 shown in FIG. 4, and an image is displayed on the display screen 211 in accordance with instructions from the CPU 230. According to operation instructions through the operation keys 221, the CPU 230 executes a process corresponding to the operation.

A battery (not shown) is loaded into the power supply portion 235, and the power from the battery is supplied to the CPU 230, and various portions of the portable telephone 200 under the control of the CPU 230.

As components for realizing the telephone function, the portable telephone 200 comprises the antenna 213 which is shown also in FIGS. 4 and 5, a transmission/reception portion 241, a signal process portion 242, and a communication portion 243. The communication portion 243 includes: a microphone 243a which is placed in the mouthpiece 222 of FIG. 4; and a speaker 243b which is placed in the earpiece 212.

The transmission/reception portion 241 is a circuit component which is in charge of transmission and reception of a radio wave through the antenna 213. A signal which is obtained in the transmission/reception portion 241 as result of reception of a radio wave at the antenna 213 is supplied to the signal process portion 242, and subjected to a signal process to be output as a sound from the speaker 243b of the communication portion 243. A sound which is picked up by the microphone 243a of the communication portion 243 is subjected to a signal process in the signal process portion 242, and output as a radio wave from the antenna 213 through the transmission/reception portion 241.

The portable telephone 200 has also a packet communication function. A packet signal received through the antenna 213 and the transmission/reception portion 241 is subjected to an adequate signal process in the signal process portion 242, and then once stored into the RAM 231. In the case of a downloaded program, it is stored into the rewritable ROM 234. The packet data in the RAM 231 are displayed on the display screen 211 (see FIG. 4) of the display portion 233 by the CPU 230 which receives instructions through the operation keys 221, or programs stored in the rewritable ROM are executed.

A packet communication document or the like which is prepared through the operation keys 221 is once stored in the RAM 231 at the timing of preparation, sent to the signal process portion 242 in accordance with transmission instructions from the operation keys 221 to be subjected to a transmission signal process, and then transmitted as a radio wave through the transmission/reception portion 241 and the antenna 213.

The portable telephone 200 has an image function, and, as a component which plays a role of the image function, comprises an imaging apparatus 1 having the configuration which has been described as the prior art example.

Figure 1:
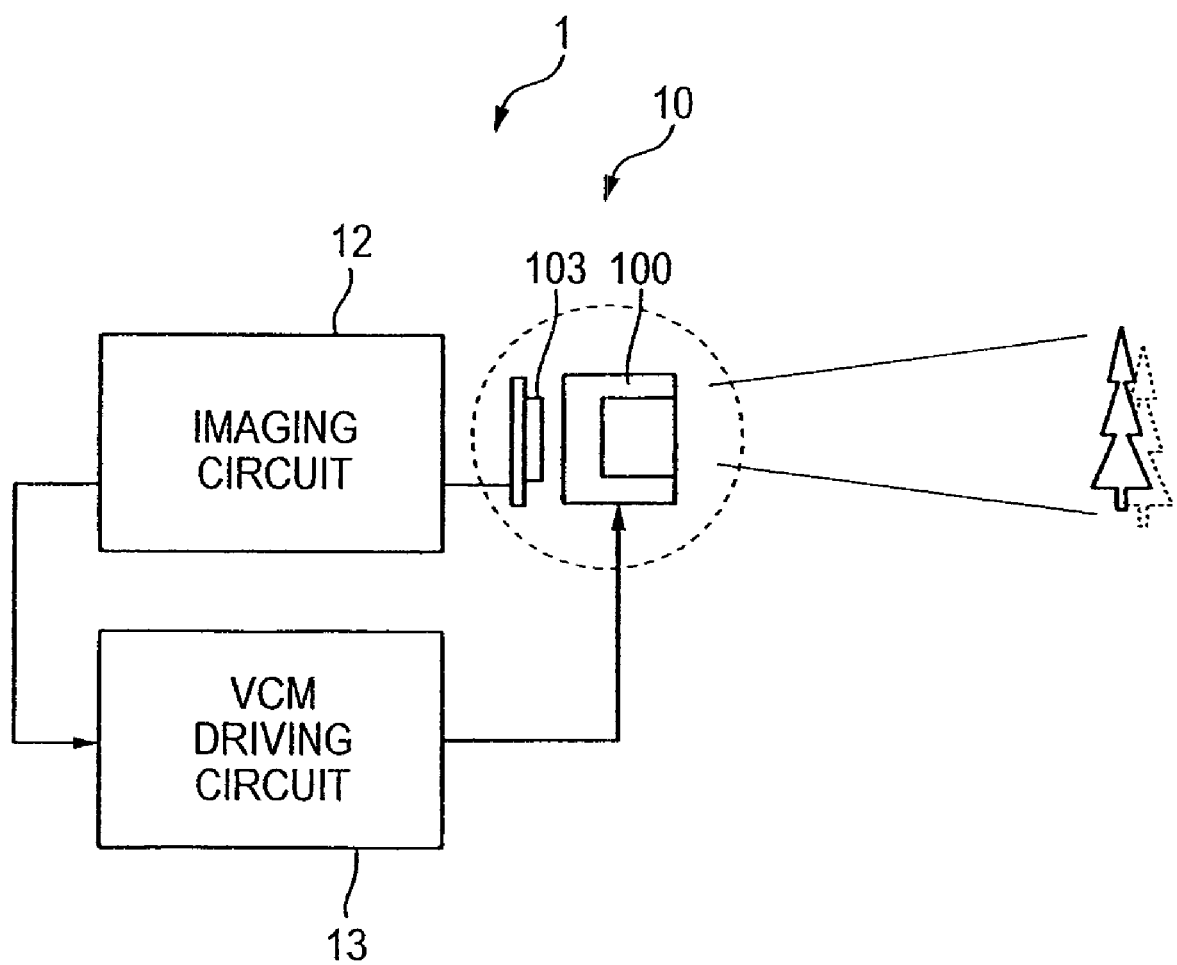
FIG. 1 is a view showing an example of the configuration of an imaging apparatus comprising a voice coil motor.
Figure 2A:
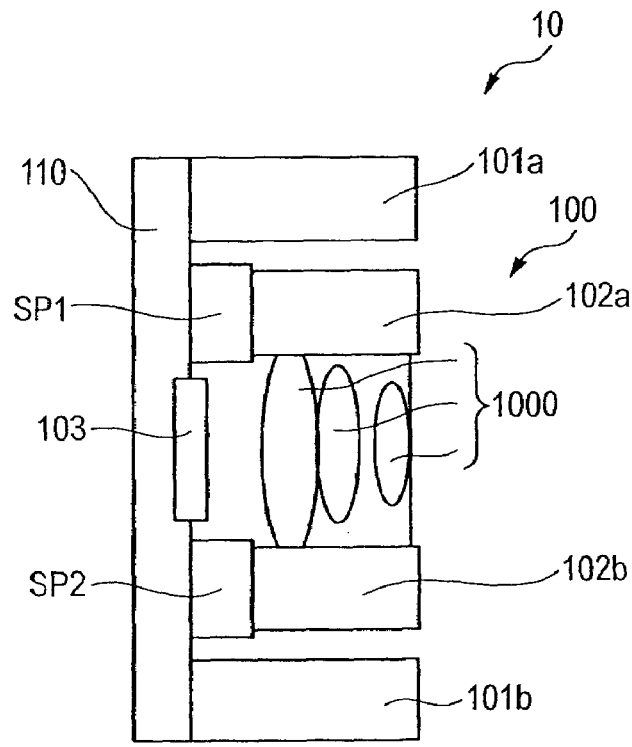
FIG. 2 is a view illustrating the internal configuration of an imaging unit 10.
Figure 2B:
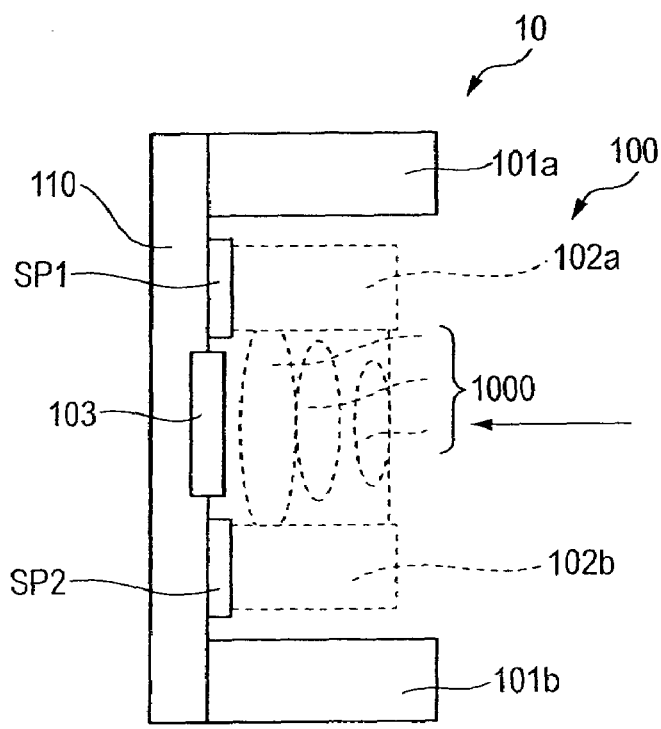
Figure 3A:
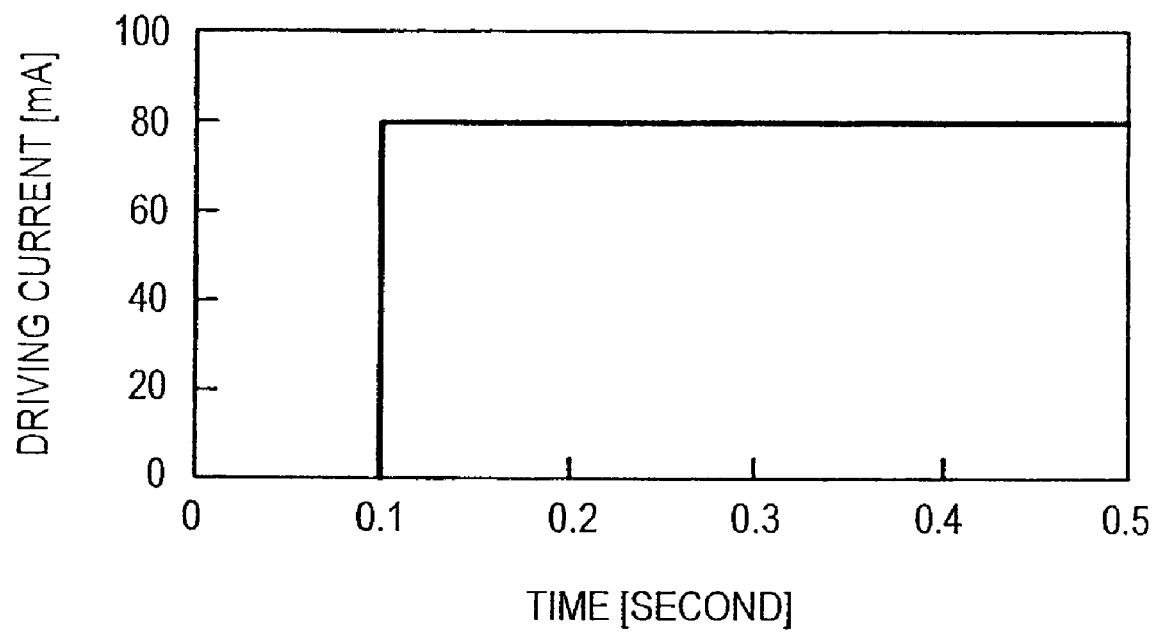
FIG. 3 is a view showing a current supplied to a coil, and a displacement of an imaging lens.
Figure 3B:
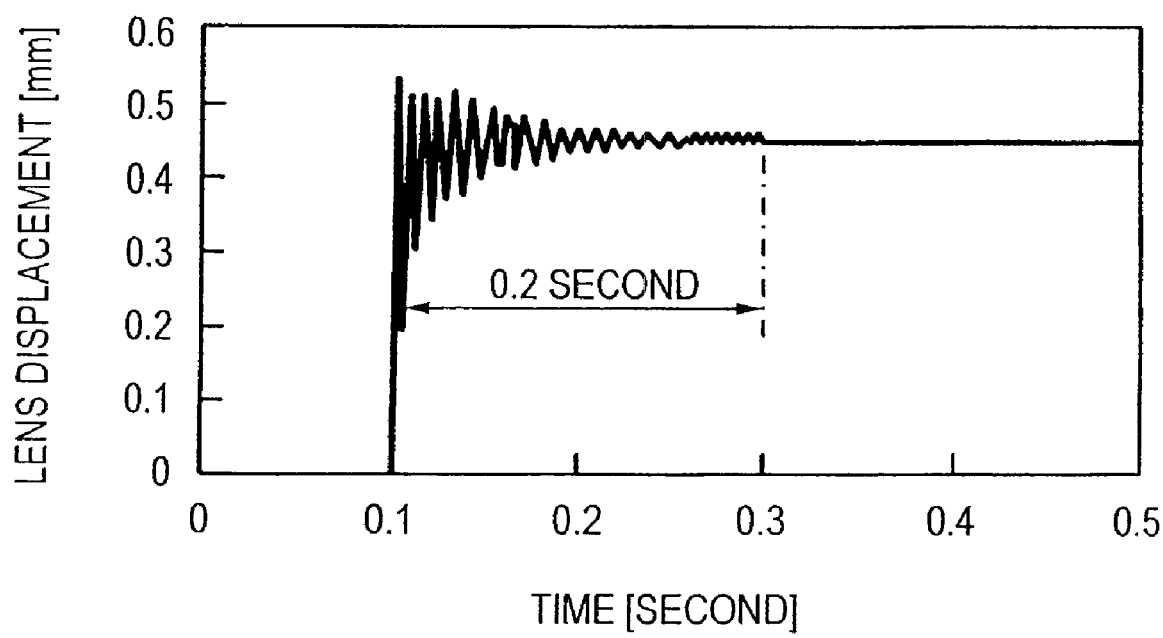

An image portion of the imaging apparatus 1 comprises the imaging unit 10 shown in FIG. 1. An object image which is taken through the imaging lens 1000 in the imaging unit 10 is picked up by the image pickup device 103 to produce image data. The image data obtained in the image pickup device 103 are process by the imaging circuit 12 to be converted to digital image data, and then once stored into the RAM 231 through the CPU 230. In accordance with an operation on the operation keys 221, the data are displayed on the display screen 211 of the display portion 233.

The image portion of the portable telephone 200 of the embodiment comprises the imaging unit 10 having the configuration shown in FIG. 1. Therefore, a VCM driving circuit 131 for driving the coils 102a, 102b in the imaging unit 10 is disposed in an output portion of the CPU 230.

In the embodiment, the lens drive portion in the invention is configured by VCMs comprising the magnets 101a, 101b and the coils 102a, 102b, and an example of the movement control portion in the invention is configured by the CPU 230 and the VCM driving circuit 131.

In the VCM driving circuit 131 in the embodiment, a current signal producing circuit and a current waveform converting circuit are disposed. When the imaging lens 1000 is to be moved, the VCM driving circuit 131 gives a current signal which is gradually changed from a current signal corresponding to a position before movement of the imaging lens 1000, to a current signal corresponding to a position after movement, to each of the coils 102a, 102b of the VCMs serving as an example of the lens drive portion in the invention.

In the embodiment, when the CPU 230 supplies a control signal corresponding to the driving amount, a step-like current signal (see the waveform in FIG. 6) is produced in accordance with the control signal by the current signal producing circuit of the VCM driving circuit 131, and the produced step-like current signal is supplied to the current waveform converting circuit in the subsequent stage. The current signal producing circuit and the current waveform converting circuit can be simply configured by using circuit devices such as transistors. In order to describe this, a circuit example of the current waveform converting circuit will be described later. When the step-like current signal is supplied from the current signal producing circuit in the preceding stage to the current waveform converting circuit, the current signal which is gradually changed from the current signal corresponding to the position before movement of the imaging lens 1000, to the current signal corresponding to the position after movement is produced in the current waveform converting circuit in the VCM driving circuit 131, and the produced current signal is supplied to the coil 102.

When the current signal which is gradually changed from the current signal corresponding to the position before movement of the imaging lens, to the current signal corresponding to the position after movement is supplied to each of the coils 102a, 102b as described above, the imaging lens 1000 is slowly started to be moved so as not to apply a large force to the springs, and thereafter moved to a predetermined position while gradually increasing the speed, and stopped there. Unlike the prior art, the phenomenon that the imaging unit 10 vibrates and a prolonged time must elapse before the unit stops does not occur. As a result, at a photo opportunity, the user can adequately perform in-focus imaging with using the imaging apparatus 1 provided in the portable telephone 200.

A specific circuit example of the current waveform converting circuit provided in the above-described VCM driving circuit 131 will be described with reference to FIG. 7.

FIG. 7 is a view illustrating an example of the configuration of the current waveform converting circuit 131.

Figure 7A:
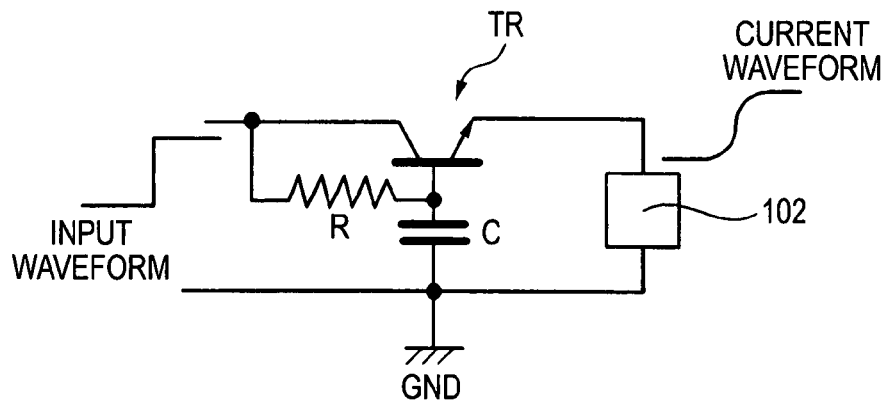
FIG. 7 is a view illustrating an example of the configuration of a VCM driving circuit.
Figure 7B:
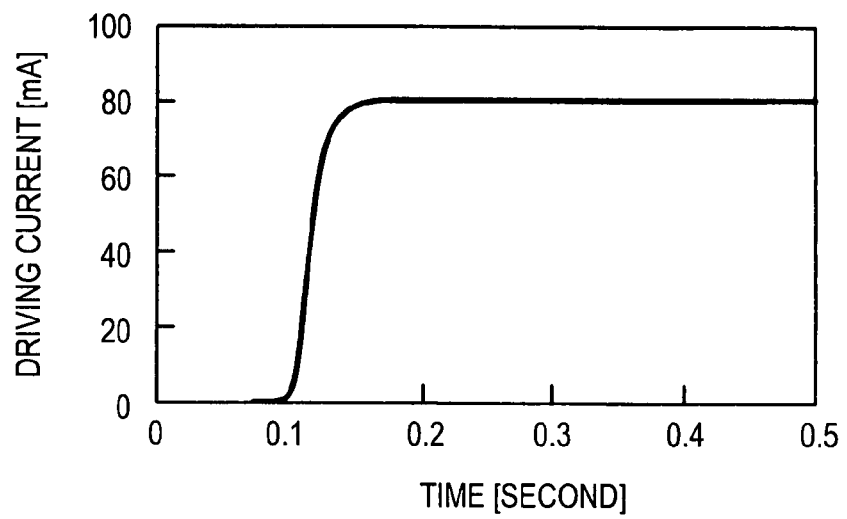
Figure 7C:
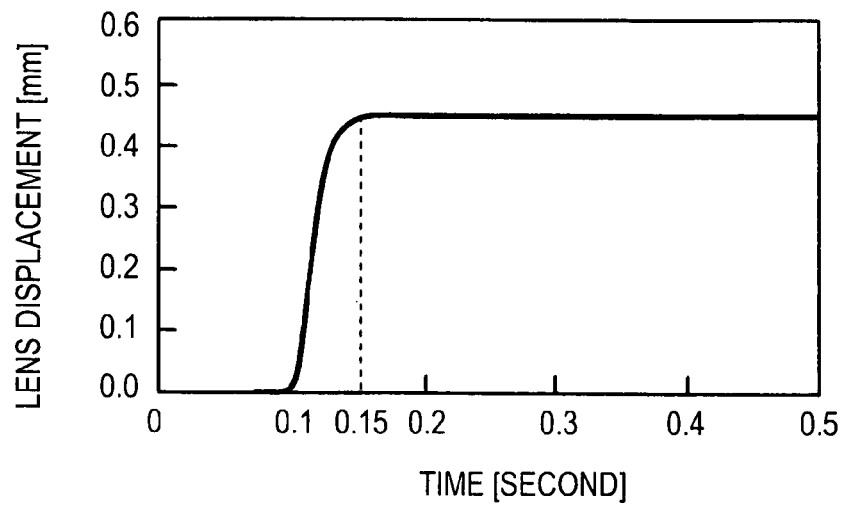

FIG. 7A shows the specific circuit configuration example of the current waveform converting circuit provided in the VCM driving circuit 131. FIG. 7B shows a response output waveform obtained when a step-like current signal is supplied from the current signal producing circuit in the preceding stage of the VCM driving circuit 131 to the circuit shown in FIG. 7A. FIG. 7C shows a displacement of the imaging lens 1000 which, when the coils 102a, 102b are energized by the current signal having the response output waveform, receives a force due to interactions between the coils 102a, 102b and the magnets 101a, 101b, and is moved in the optical axis direction together with the coils 102a, 102b. The ordinate in FIG. 7B indicates a driving current (mA), and the abscissa indicates the time (second). The ordinate in FIG. 7C indicates the displacement (mm) of the imaging lens, and the abscissa indicates the time (second).

First, the CPU 230 supplies the control signal indicating the driving amount to the VCM driving circuit 131, the current signal producing circuit in the VCM driving circuit 131 produces the step-like current signal, and the produced step-like current signal is supplied to the current waveform converting circuit in the subsequent stage. Then, a current signal having a current waveform shown in FIG. 7B is output.

Hereinafter, the configuration of the circuit shown in FIG. 7A will be described.

The current waveform converting circuit provided in the VCM driving circuit 131 shown in FIG. 7A is configured by a transistor TR, a resistor R, and a capacitor C. The collector of the transistor TR is connected to the CPU 230, and the emitter of the transistor TR is connected to the coil 102 provided in the VCMs. By contrast, the base of the transistor TR is connected to the capacitor C, and the capacitor C is connected to the ground GND. The base and collector of the transistor TR are connected to each other through the resistor R.

Next, the operation of the current waveform converting circuit shown in FIG. 7A will be described.

When the step-like current signal is supplied from the current signal producing circuit in the preceding stage to the collector of the transistor TR which is the input end of the current waveform converting circuit of FIG. 7A, a current is supplied through the resistor R to the base of the transistor TR, and the base potential is raised to produce a potential difference between the base and the emitter. Therefore, the transistor TR enters the operation state.

The capacitor C is disposed between the base of the transistor TR of the current waveform converting circuit of FIG. 7A and the ground GND. Even the step-like signal is input into the collector of the resistor R, therefore, the base potential is not immediately raised, but gradually raised by the integration function of the capacitor C. Accordingly, the base potential of the transistor TR is gradually raised, and the potential difference between the base and the emitter is gradually increased. Therefore, the current signal which is output from the emitter of the transistor TR is gradually changed and increased.

In this way, the step-like current is supplied to the collector of the transistor TR shown in FIG. 7A. Then, a current signal which is gradually changed as shown in FIG. 7B is supplied to the coils 102a, 102b. In accordance with the current signal which is gradually changed, therefore, the imaging lens is gradually started to be moved, so that the movement of the imaging lens 1000 can be started without largely affecting the springs SP1, SP2 supporting the coils 102a, 102b.

Unlike the prior art, the phenomenon that a large external force is suddenly applied to the springs SP1, SP2 supporting the coils 102a, 102b does not occur. Therefore, the imaging lens can be stopped within a time period which is shorter than the prior art, for example, within 0.05 seconds as shown in FIG. 7C.

As described above, according to the invention, an imaging apparatus in which, when an imaging unit is moved in the optical axis direction by a VCM, the imaging unit can be stopped within a time period that is shorter than the prior art, and a portable apparatus comprising the imaging apparatus can be realized.

When an imaging apparatus is to be mounted in the portable telephone, the imaging apparatus is requested to have a small and thin structure as described in the prior art column. Therefore, it is desirable that the VCM driving circuit 131 is made small as far as possible by integrating it into one chip.

In the first embodiment, however, the current signal producing circuit in the VCM driving circuit 131, and the current waveform converting circuit shown in FIG. 7A are configured by the transistor TR, the capacitor C, and the resistor R, and hence the circuits are somewhat difficult to be integrated. In the current waveform converting circuit shown in FIG. 7A, particularly, the capacity of the capacitance is so large that the circuit cannot be integrated. For example, a digital-analog converter (hereinafter, referred to as DAC) which can be easily controlled by the CPU 230 may be used in place of the current signal producing circuit. In this case, the control of the CPU 230 can be simplified, and the VCM driving circuit can be integrated so as to achieve miniaturization.

Figure 8:
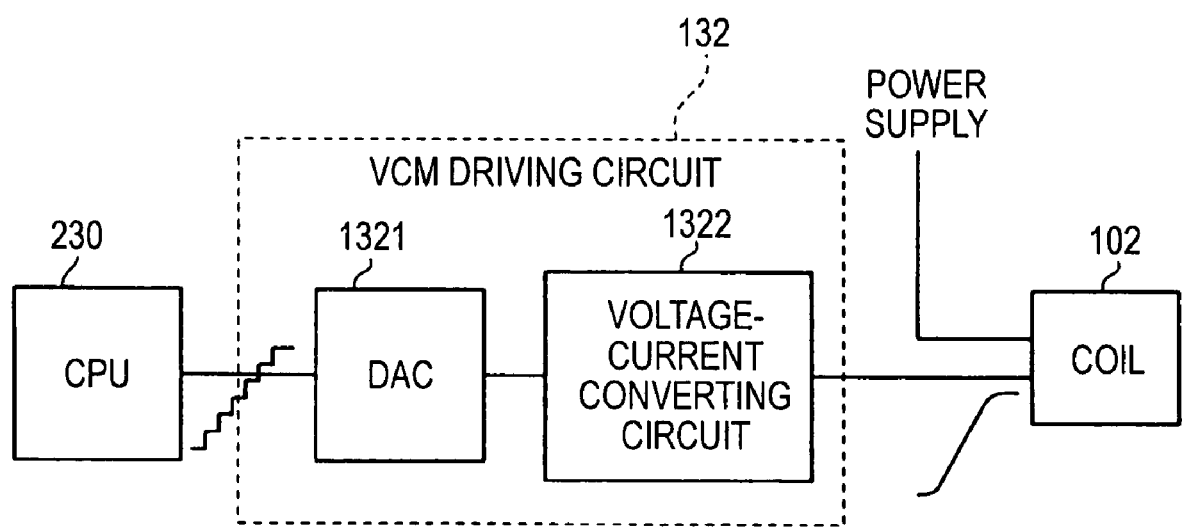
FIG. 8 is a view illustrating a second embodiment.

FIG. 8 is a view illustrating a second embodiment in which miniaturization can be realized.

FIG. 8 is a view showing an example in which, in consideration of integration into one-chip for miniaturizing a VCM driving circuit 132, the VCM driving circuit 132 is configured by a DAC 1321 that is an example of the current signal producing circuit in the invention, and a voltage-current converting circuit 1322.

Also when, as shown in FIG. 8, the VCM driving circuit 132 is configured by: the DAC 1321 that outputs a stair-like voltage signal in accordance with the increase of stair-like digital data supplied from the CPU 230; and the voltage-current converting circuit 1322 that converts a voltage signal supplied from the DAC 1321 into a current signal, it is possible to attain effects which are equivalent to those attained by the waveform conversion using the circuit of FIG. 7A.

When the DAC 1321 is used, the CPU 230 can read out one of many functions stored in an internal memory or the like, and with elapse of time supplies digital data indicating the function to the DAC 1321, thereby enabling the DAC 1321 to output a voltage signal which is gradually changed in accordance with the curve of the function. The voltage signal output from the DAC 1321 is converted into a current signal by the voltage-current converting circuit 1322 in the subsequent stage, so that the current signal corresponding to the waveform of the voltage signal output from the DAC 1321 can be supplied to the coil 102.

The CPU 230 can control the DAC 1321 in the preceding stage of the VCM driving circuit 132 so as to output a voltage signal which is gradually increased with elapse of time in the form of various kinds of curves. Therefore, the voltage-current converting circuit in the subsequent stage of the VCM driving circuit 132 can output a current signal which is gradually increased in the form of various kinds of curves.

Finally, the operation of the VCM driving circuit 132 will be described with using an output example where the CPU 230 supplies digital data which are gradually changed from digital data corresponding to a position before movement to those corresponding to a position after movement, to the VCM driving circuit 132, thereby causing the VCM driving circuit 132 to output a current signal.

FIGS. 9 and 10 are views illustrating an output waveform in the case where the CPU 230 supplies digital data which are gradually increased with elapse of time, to the VCM driving circuit 132, thereby causing the VCM driving circuit 132 to output a current signal which is gradually changed.

Figure 9A:
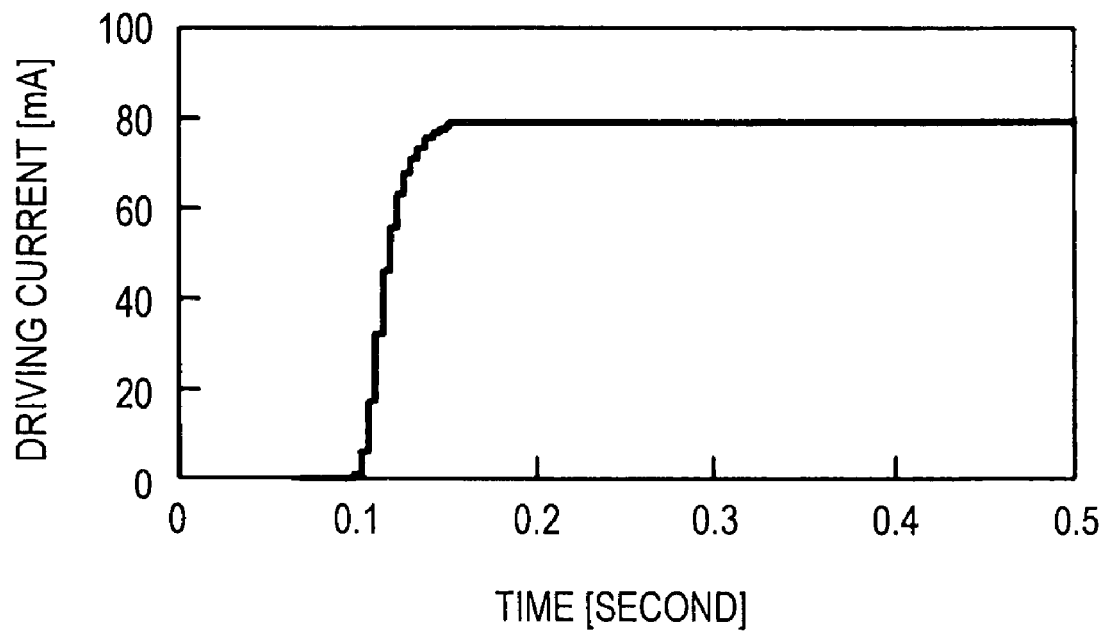
FIG. 9 is a view illustrating an example of a case where a CPU 230 supplies digital data indicative of, for example, a function having a curve to a DAC 1321, to obtain an output signal.
Figure 9B:
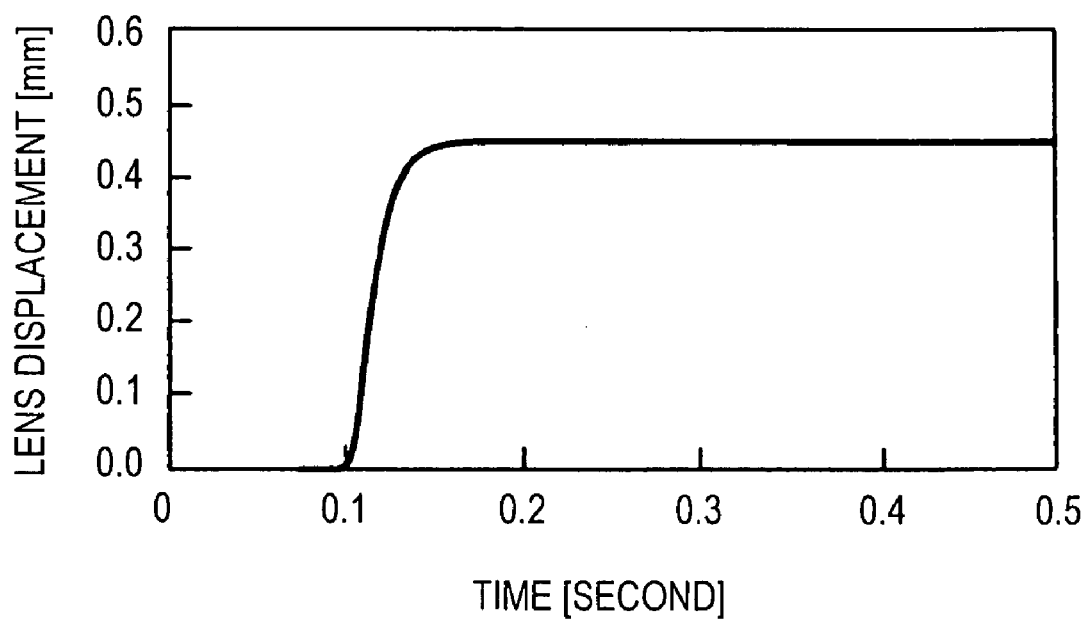
Figure 10A:
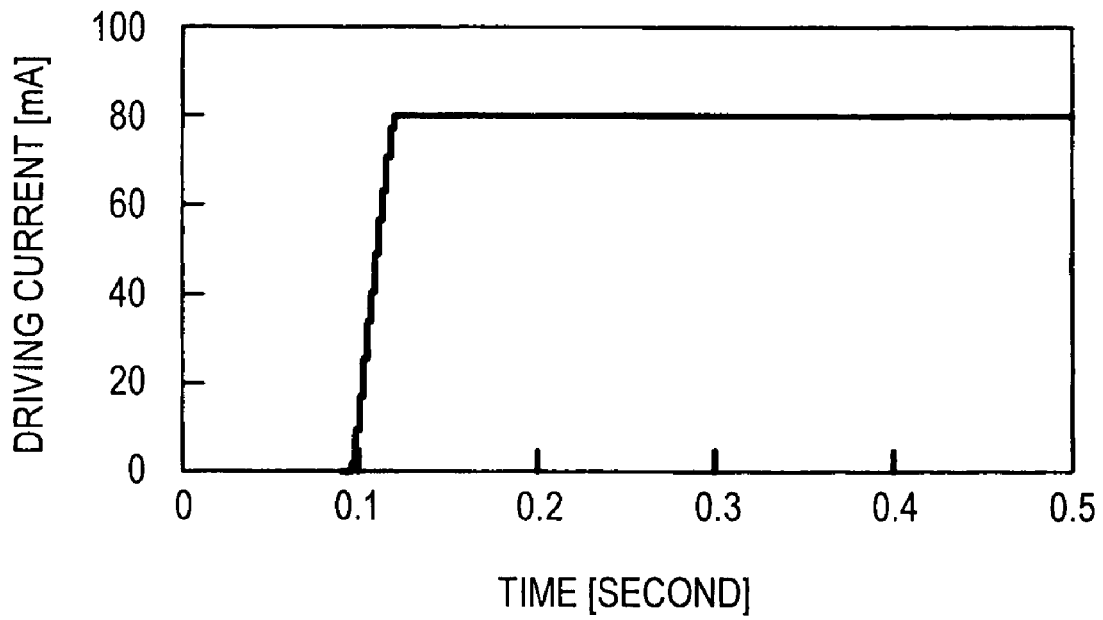
FIG. 10 is a view illustrating an example of a case where the CPU supplies digital data indicative of, for example, a function having an inclination to the DAC, to obtain a waveform of an output signal.
Figure 10B:
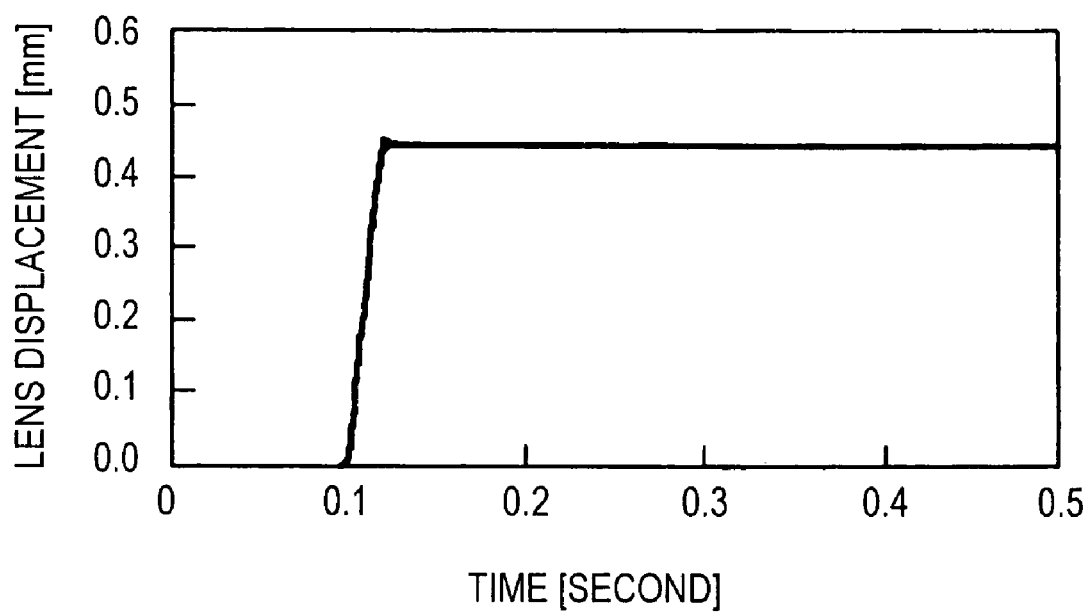

The abscissas of FIGS. 9A and 10A indicate the time, and the ordinates indicate a driving current (mA). The abscissas of FIGS. 9B and 10B indicate the time (second), and the ordinates indicate the lens displacement (mm).

FIG. 9 shows an example in the case where the CPU 230 supplies digital data which are gradually changed from digital data corresponding to a position before movement to those corresponding to a position after movement, to the DAC 1321, the voltage-current converting circuit 1322 outputs a current signal having a curve corresponding to the change of the digital data, and the current signal is supplied to the coil 102.

According to the configuration, the phenomenon that a current is suddenly supplied to the coil 102 does not occur, and the imaging unit does not vibrate. Therefore, the imaging unit is gradually moved from the position before movement to that after movement, and immediately stopped there.

FIG. 10 shows an example in the case where digital data which are gradually changed in a curve different from that in the example of FIG. 9 are supplied to the DAC 1321, the voltage-current converting circuit 1322 outputs a current signal having a curve corresponding to the change of the digital data, and the current signal is supplied to the coil 102.

Also in the case where the current signal shown in FIG. 10 is supplied to the coil 102, it is possible to attain effects which are equivalent to those attained by the example of FIG. 9.

In any case, the phenomenon that a step-like current is suddenly supplied to apply a large external force to the coil does not occur. Even when the imaging lens is extensibly supported by the springs, therefore, the imaging lens does not vibrate together with the springs, and the imaging lens can be stopped at a predetermined position within a short time period.

As described above, according to the invention, an imaging apparatus in which, when an imaging unit is moved in the optical axis direction by a VCM, the imaging unit can be stopped within a time period that is shorter than the prior art, and a portable apparatus comprising the imaging apparatus can be realized.

The entire disclosure of each and every foreign patent application from which the benefit of foreign priority has been claimed in the present application is incorporated herein by reference, as if fully set forth.

What is claimed is:

1. An imaging apparatus comprising:
an imaging lens;
an image pickup device that is placed behind the imaging lens;
a lens drive portion that includes
a magnet that forms a magnetic field and
a coil, placed in the magnetic field, that, upon an input of a current signal, receives a force in an optical axis direction to move the imaging lens to a position corresponding to the current signal,
the lens drive portion holding the imaging lens, and moving the imaging lens to the position corresponding to the current signal in the optical axis direction; and
a movement control portion that, when the imaging lens is to be moved, gives to the lens drive portion, a current signal that is gradually changed from a first current signal corresponding to a first position before movement of the imaging lens, to a second current signal corresponding to a second position after movement.

2. An imaging apparatus according to claim 1,
wherein the movement control portion comprises:
a current signal producing circuit that produces a current signal that is changed in a step-like manner from the first current signal corresponding to the first position before movement of the imaging lens, to the second current signal corresponding to the second position after movement; and
a current waveform converting circuit that receives the current signal that is produced by the current signal producing circuit and is changed in a step-like manner, produces the current signal that is gradually changed from the first current signal corresponding to the first position before movement of the imaging lens, to the second current signal corresponding to the second position after movement, and supplies the produced current signal to the lens drive portion.

3. An imaging apparatus according to claim 2,
wherein the current waveform converting circuit comprises:
a transistor having a collector connected to the current signal producing circuit, an emitter connected to the coil, and a base;
a capacitor connected to the base of the transistor and to ground; and
a resistor having an end connected to the base of the transistor and another end connected to the collector of the transistor.

4. An imaging apparatus according to claim 1,
wherein the movement control portion comprises:
a voltage signal producing circuit that produces a voltage signal that is gradually changed from a first voltage signal corresponding to the first position before movement of the imaging lens, to a second voltage signal corresponding to the second position after movement; and
a voltage-current converting circuit that converts the voltage signal produced by the voltage signal producing circuit to a current signal, and supplies the current signal to the lens drive portion.

5. An imaging apparatus according to claim 4,
wherein the voltage signal producing circuit is a D-A converter that receives digital data that are gradually changed from digital data corresponding to the first position before movement of the imaging lens, to digital data corresponding to the second position after movement, and converts the input digital data to an analog voltage signal.

6. A portable apparatus comprising an imaging apparatus, the imaging apparatus comprising:
an imaging lens;
an image pickup device that is placed behind the imaging lens;
a lens drive portion that holds the imaging lens and moves the imaging lens to a position corresponding to a current signal in an optical axis direction; and
a movement control portion that, when the imaging lens is to be moved, gives to the lens drive portion, a current signal that is gradually changed from a first current signal corresponding to a first position before movement of the imaging lens, to a second current signal corresponding to a second position after movement.

* * * * *